United States Patent
Wang et al.

(10) Patent No.: US 12,145,866 B2
(45) Date of Patent: Nov. 19, 2024

(54) MODIFIED CYCLODEXTRIN/MESOPOROUS SILICA FOR ADSORBING Pb AND Cd AND APPLICATION THEREOF

(71) Applicant: Jiangnan University, Wuxi (CN)

(72) Inventors: Jinpeng Wang, Wuxi (CN); Jing Li, Wuxi (CN); Zhengyu Jin, Wuxi (CN); Xueming Xu, Wuxi (CN); Yaoqi Tian, Wuxi (CN); Jie Long, Wuxi (CN); Xing Zhou, Wuxi (CN); Zhengjun Xie, Wuxi (CN)

(73) Assignee: Jiangnan University, Wuxi (CN)

( * ) Notice: Subject to any disclaimer, the term of this patent is extended or adjusted under 35 U.S.C. 154(b) by 709 days.

(21) Appl. No.: 17/402,871

(22) Filed: Aug. 16, 2021

(65) Prior Publication Data
US 2021/0371302 A1 Dec. 2, 2021

Related U.S. Application Data

(63) Continuation of application No. PCT/CN2019/121385, filed on Nov. 28, 2019.

(30) Foreign Application Priority Data
Nov. 5, 2019 (CN) .......................... 2019110723940

(51) Int. Cl.
*C02F 1/28* (2023.01)
*B01J 20/24* (2006.01)
(Continued)

(52) U.S. Cl.
CPC .............. *C02F 1/288* (2013.01); *B01J 20/24* (2013.01); *B01J 20/28083* (2013.01);
(Continued)

(58) Field of Classification Search
None
See application file for complete search history.

(56) References Cited

FOREIGN PATENT DOCUMENTS

| CN | 107597070 A | * | 1/2018 | |
|---|---|---|---|---|
| CN | 107961764 A | * | 4/2018 | .............. B01J 13/02 |
| CN | 109160962 A | | 1/2019 | |

OTHER PUBLICATIONS

Machine translation of CN-107597070-A, pp. 1-6. (Year: 2018).*
(Continued)

*Primary Examiner* — Clare M Perrin
(74) *Attorney, Agent, or Firm* — IPRO, PLLC; Na Xu

(57) ABSTRACT

The disclosure provides a modified cyclodextrin/mesoporous silica for adsorbing Pb and Cd and application thereof, belonging to the technical field of adsorbent materials. By using surface modification, chloroacetic acid is used as anions, and a modified cyclodextrin is grafted onto a surface of a cyclodextrin/mesoporous silica by nucleophilic substitution to prepare the modified cyclodextrin/mesoporous silica adsorbent material. The modified cyclodextrin/mesoporous silica adsorbent material prepared in the disclosure has the advantages of simple preparation method, strong adsorbability, easy separation, good biocompatibility and the like. When the material is used as an adsorbent to adsorb heavy metal ions $Pb^{2+}$ and $Cd^{2+}$, maximum removal rates can reach 97.8% and 81.29% respectively. Therefore, the material has wide application prospects in removal of heavy metals in sewage and the like, thereby improving the water environment that people depend on for survival.

10 Claims, 6 Drawing Sheets

(51) Int. Cl.
*B01J 20/28* (2006.01)
*B01J 20/30* (2006.01)
*C02F 1/62* (2023.01)
*C02F 101/20* (2006.01)

(52) U.S. Cl.
CPC ............. *B01J 20/3071* (2013.01); *C02F 1/62* (2013.01); *B01J 2220/46* (2013.01); *B01J 2220/4831* (2013.01); *C02F 1/281* (2013.01); *C02F 1/285* (2013.01); *C02F 2101/20* (2013.01)

(56) References Cited

OTHER PUBLICATIONS

Machine translation of CN-107961764-A, pp. 1-11. (Year: 2018).*
Badruddoza et al. (Carbohydrate Polymers, 2013, 91, 322-332). (Year: 2013).*
Abu Zayed M Badruddoza et al. Fe3O4/cyclodextrin polymer nanocomposites for selective heavy metals removal from industrial wastewater, Carbohydrate polyers 91(2013) 322-332.

* cited by examiner

MODIFIED CYCLODEXTRIN/MESOPOROUS SILICA FOR ADSORBING Pb AND Cd AND APPLICATION THEREOF

TECHNICAL FIELD

The disclosure relates to a modified cyclodextrin/mesoporous silica for adsorbing Pb and Cd and application thereof, belonging to the technical field of adsorbent materials.

BACKGROUND

With the acceleration of industrialization, the content of heavy metal ions in industrial wastewater is increasing. It has become a pollution problem that cannot be ignored, has significant influence on human health and the ecosystem and needs to be solved urgently.

β-CD is non-toxic and easily degradable, and has a special molecular structure of "hydrophilic outer cavity and hydrophobic inner cavity". However, due to the limited cavity size, the solubility in water, poor mechanical properties and the like, it is still difficult to construct supramolecular materials, and traditional modified cyclodextrins have the problems including complicated preparation process, large amount of reactants, relative high cost and low yield of product intermediates.

At present, there have been many researches on adsorbent materials, but traditional adsorbents have the problems of long adsorption time, low adsorption rate, poor adsorption effect, poor selectivity and the like, and most materials have the problems of complex preparation, uncontrollability, poor stability and the like. Based on this, the modified cyclodextrin/mesoporous silica adsorbent material prepared by the disclosure is simple and accessible, can realize rapid adsorption in a short time, has good selectivity for Pb and Cd, and has important application values in wastewater treatment and other aspects.

SUMMARY

In view of the above problems in the prior art, the disclosure provides a preparation method of a modified cyclodextrin/mesoporous silica adsorbent material for selectively adsorbing Pb and Cd. The disclosure has the advantages of simple and controllable preparation steps, high flexibility, easy promotion, low cost, high adsorption efficiency, recyclability and the like, can effectively solve the problems of heavy metal ion pollution and the like in wastewater treatment, and also has potential application in the fields of chemical industry, petroleum, food, light industry, environmental protection and the like.

A first objective of the disclosure is to provide a modified cyclodextrin/mesoporous silica. A preparation method of the modified cyclodextrin/mesoporous silica includes: selecting chloroacetic acid as anions, grafting a modified cyclodextrin onto a surface of a cyclodextrin/mesoporous silica (EA-CD-Si@Si) by nucleophilic substitution, and realizing anion carboxymethyl modification on the material surface by controlling a pH of the solution to obtain the modified cyclodextrin/mesoporous silica (CM-EACD@Si). The cyclodextrin/mesoporous silica (EA-CD-Si@Si) is prepared with reference to the patent publication No. CN107597070A.

A second objective of the disclosure is to provide a preparation method of a modified cyclodextrin/mesoporous silica. The preparation method of the modified cyclodextrin/mesoporous silica includes: selecting chloroacetic acid as anions, grafting a modified cyclodextrin onto a surface of a cyclodextrin/mesoporous silica (EA-CD-Si@Si) by nucleophilic substitution, and realizing anion carboxymethyl modification on the material surface by controlling a pH of the solution to obtain the modified cyclodextrin/mesoporous silica (CM-EACD@Si). The cyclodextrin/mesoporous silica (EA-CD-Si@Si) is prepared with reference to the patent publication No. CN107597070A.

In an embodiment of the disclosure, the EA-CD-Si@Si is prepared by the following steps:
(1) preparing 6-aminoethyl-β-cyclodextrin, that is 6-EA-β-CD;
(2) preparing a hybrid silica insoluble carrier, that is Cl—Si; and
(3) preparing the hybrid adsorbent material in a core-shell structure, that is EA-CD-Si@Si.

The preparation method of the Cl—Si includes:
(1) sufficiently dissolving 3-chloropropyl-triethoxysilane and tetraethyl silicate in anhydrous ethanol;
(2) dissolving ultrapure water and tetrabutylammonium fluoride in another anhydrous ethanol solution; and
(3) thoroughly mixing the two mixed solutions in step (1) and step (2), shaking vigorously for 5-10 s, allowing the mixture to stand, observing gel formation, performing aging at room temperature for 3-7 days, pulverizing the gel, performing filtration, washing the solid sequentially with ethanol and acetone solutions, and drying the solid at 80° C. for 6-12 h to obtain white powder Cl—Si.

The preparation method of the EA-CD-Si@Si includes:
dissolving the 6-EA-β-CD, the Cl—Si and KI in N,N-dimethylformamide, then blowing nitrogen into a reaction vessel for 3-5 min to expel air in the reaction vessel, stirring the mixture at 90-120° C. to react for 12-48 h, cooling the reaction system to room temperature after the completion of the reaction, filtering the reaction system, washing the solid sequentially with N,N-dimethylformamide, ethanol and water, and performing vacuum drying at 80° C. for 6-12 h to obtain white powder EA-CD-Si@Si.

In an embodiment of the disclosure, the preparation method specifically includes the following steps:
(1) dissolving EA-CD-Si@Si and NaOH particles in distilled water, adding a chloroacetic acid solution, stirring the mixture thoroughly and uniformly, reacting the reaction system at 40-80° C. for 6-18 h, and performing cooling; and
(2) adjusting a pH of the reaction system after the reaction, precipitating the product with a methanol solution, filtering the mixture, washing the product, and drying the product at 40-60° C. to obtain the modified cyclodextrin/mesoporous silica (CM-EACD@Si).

In an embodiment of the disclosure, a mass ratio of the EA-CD-Si@Si to the NaOH in step (1) is 0.5:1-2.5:1.

In an embodiment of the disclosure, an amount of the distilled water in step (1) is 1-5 times a total mass of the cyclodextrin/mesoporous silica powder and the NaOH particles.

In an embodiment of the disclosure, a concentration of the chloroacetic acid in step (1) is 5%-25%, and an amount is 0.5-2.5 times a total mass of the EA-CD-Si@Si and the NaOH.

In an embodiment of the disclosure, in step (2), the reaction system is adjusted to the pH of 5-9.

In an embodiment of the disclosure, the method specifically includes: adding 5.0 g of EA-CD-Si@Si and 4.65 g of NaOH into 18.5 mL of ultrapure water, stirring the mixture at room temperature, adding 13.5 mL of a 16.3% chloroacetic acid solution, reacting the reaction system at 60° C. for 6 h, performing cooling, adding 36% HCl to adjust a pH of the solution to 7, precipitating the product with methanol, filtering the mixture, washing the product, and performing vacuum drying on the sample to obtain CM-EACD@Si.

In an embodiment of the disclosure, the method specifically includes: dissolving 10 g of EA-β-CD@Si and 5 g of NaOH particles in 10 mL of distilled water, adding 10 mL of a 10% chloroacetic acid solution, reacting the reaction system at 60° C. for 10 h, performing cooling, adding 36% HCl to adjust a pH of the solution to 6, precipitating the product with 50 mL of methanol, filtering the mixture, washing the product, and performing vacuum drying at 40° C. to obtain CM-EACD@Si.

In an embodiment of the disclosure, 5 g of EA-β-CD@Si and 2.5 g of NaOH particles are dissolved in 10 mL of distilled water, 10 mL of a 16.3% chloroacetic acid solution was added, the reaction system is reacted at 80° C. for 6 h, cooling is performed, 36% HCl is added to adjust a pH of the solution to 7, the product is precipitated with 50 mL of methanol, the mixture is filtered, the product is washed, and vacuum drying is performed at 40° C. to obtain CM-EACD@Si.

A third objective of the disclosure is to provide application of the above modified cyclodextrin/mesoporous silica as an adsorbent.

In an embodiment of the disclosure, the modified cyclodextrin/mesoporous silica adsorbent is used in sewage including one or more metal ions of Pb, Cd, Cu and Ca.

In an embodiment of the disclosure, the modified cyclodextrin/mesoporous silica is used to quickly and selectively remove Pb and Cd from wastewater.

A fourth objective of the disclosure is to provide a method for quickly adsorbing Pb, where the above modified cyclodextrin/mesoporous silica is used as an adsorbent to adsorb Pb in sewage.

In an embodiment of the disclosure, adsorption conditions are: a pH is 4-6, and an adsorption time is 5 min-2 h.

A fifth objective of the disclosure is to provide a method for quickly and selectively adsorbing Pb and Cd, where the above modified cyclodextrin/mesoporous silica is used as an adsorbent to selectively adsorb Pb and Cd in sewage. Adsorption conditions are: a pH is 4-6, and an adsorption time is 5 min-2 h.

A sixth objective of the disclosure is to provide a reproduction method of a modified cyclodextrin/mesoporous silica. According to the method, CM-EACD@Si after adsorption is added to a desorption solution for reproduction treatment, thereby obtaining a reproduced adsorbent.

In an embodiment of the disclosure, the desorption solution is a nitric acid solution, a sodium ethylene diamine tetraacetate solution or a phosphoric acid solution.

In an embodiment of the disclosure, a concentration of the desorption solution is 0.1-1.0 mol/L.

In an embodiment of the disclosure, treatment conditions are: shaking at 100-500 rpm for 1-3 h.

The disclosure has the following beneficial technical effects:

(1) The modified cyclodextrin/mesoporous silica adsorbent material for selectively adsorbing Pb and Cd prepared in the disclosure has the advantages of simple synthesis steps, cheap and accessible raw materials, high specific surface area and high active sites, thereby enhancing the stereoselectivity and molecular recognition performance of the adsorbent material. Thereby, when the adsorbent material is used to adsorb and remove the heavy metal ions Pb and Cd, the maximum removal rate can reach 97.8% and 81.29% respectively.

(2) Compared with existing ordinary adsorbents, the modified cyclodextrin/mesoporous silica adsorbent material prepared in the disclosure contains abundant active sites—carboxylate ions, and thus, has high mechanical stability and significant adsorption effect. Besides, the material has the advantages of high adsorption rate, high removal rate, recyclability, low recovery cost and low production cost, can easily implement mass and large-scale production, and can effectively solve the problems of heavy metal ions and the like in industrial wastewater.

DETAILED DESCRIPTION

The disclosure will be specifically described below in conjunction with the accompanying drawings and examples.
1. Test Method of Adsorption Capacity and Removal Rate 10 mg, 20 mg, 40 mg, 60 mg, 80 mg and 100 mg (different mass) of EA-β-CD@Si and CM-EACD@Si are respectively weighed and placed in 50 mL of a 50 mg/L HMs ($Pb^{2+}$, $Cd^{2+}$ and $Cu^{2+}$) solution, the mixture is shaken at a constant temperature of 30° C. for 2 h and centrifuged at 10000 rpm for 15 min, the supernatant is taken and measured by an ultraviolet spectrophotometer, and corresponding HMs concentrations of $Pb^{2+}$, $Cd^{2+}$ and $Cu^{2+}$ are measured by an atomic absorption spectrophotometer at 283.3 nm, 228.8 nm and 324.8 nm respectively. The adsorption capacity (Qe) and removal rate (E) are calculated by using the standard curve, formula (2-2) and formula (2-3):

$$Qe=(C_0-C_e)\times V/m$$

$$E\ (\%)=(C_0-C_e)/C_0\times 100$$

where Qe: removal capacity of β-CD for HMs ($Pb^{2+}$, $Cd^{2+}$, $Cu^{2+}$ and $Ca^{2+}$), mg; V: volume of HMs ($Pb^{2+}$, $Cd^{2+}$, $Cu^{2+}$ and $Ca^{2+}$), mL; $C_0$: initial mass concentration of HMs ($Pb^{2+}$, $Cd^{2+}$, $Cu^{2+}$ and $Ca^{2+}$), mg/L; E: removal rate, %.

2. The cyclodextrin/mesoporous silica (EA-CD-Si@Si) mentioned in the disclosure is prepared with reference to the patent publication No. CN107597070A.

Example 1: Preparation of CM-EACD@Si

Figure 1:
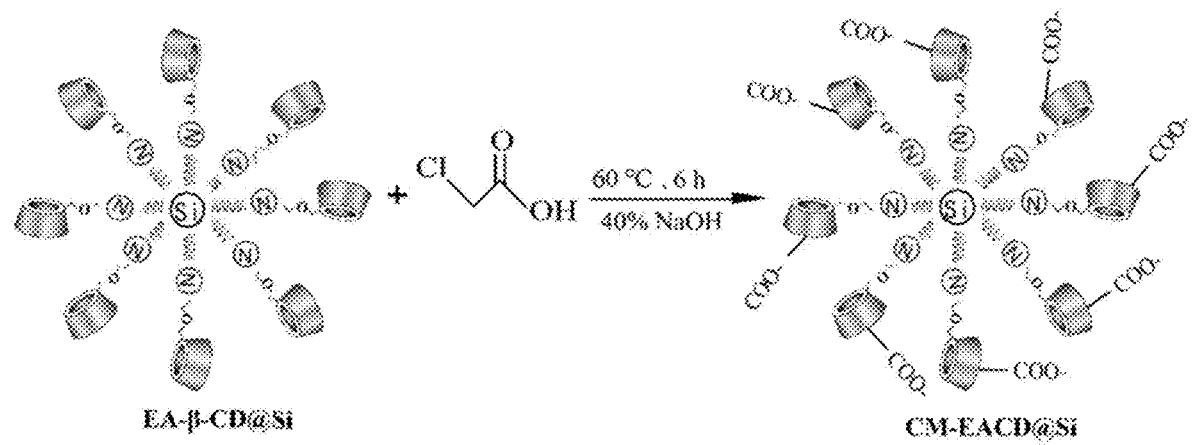
FIG. 1 is a schematic diagram of preparation of CM-EACD@Si.

A preparation method of a modified cyclodextrin/mesoporous silica adsorbent material for selectively adsorbing $Pb^{2+}$ and $Cd^{2+}$ included the following steps:

Cyclodextrin/mesoporous silica powder (EA-β-CD@Si 10 g) and NaOH particles (5 g) were dissolved in distilled water (10 mL), 10 mL of a 10% chloroacetic acid solution was added, the reaction mixture was reacted at 60° C. for 10 h, cooling was performed, 36% HCl was added to adjust a pH of the solution to 6, the product was precipitated with 50 mL of methanol, the mixture was filtered, the product was washed, and vacuum drying was performed at 40° C. to obtain 8.89 g of CM-EACD@Si. The specific reaction principle is shown in FIG. 1.

Figure 2:
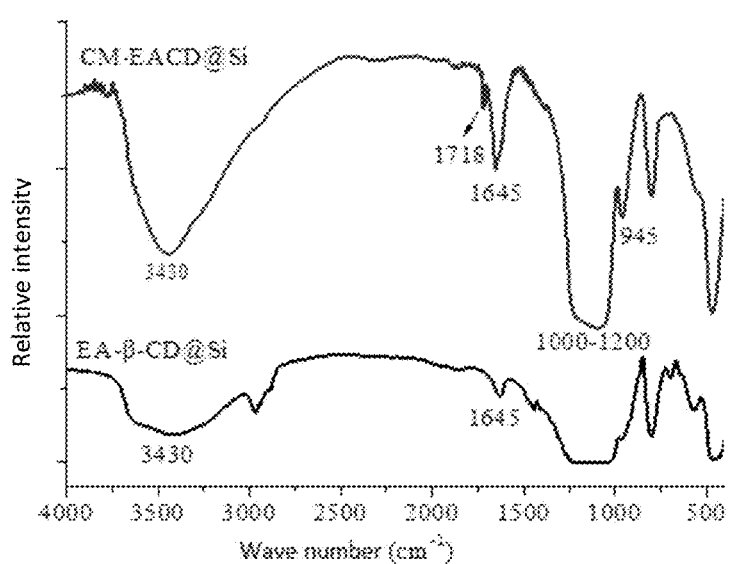
FIG. 2 is an infrared spectrogram of EA-β-CD@Si and CM-EACD@Si.

In order to determine whether carboxymethylation modification of EA-β-CD@Si was successful, FT-IR was used to characterize the infrared spectra of the EA-β-CD@Si and the CM-EACD@Si. The results are shown in FIG. 2. By comparison, it can be found that the broad peaks at 3430 cm$^{-1}$ were stretching vibration absorption peaks of O—H bond and N—H bond, and the wave number band at 1000-1200 cm$^{-1}$ belonged to stretching vibration absorption peaks of C—O bond, Si—O bond and C—O—C bond with obviously enhanced intensity, and the peak at 945 cm$^{-1}$ was the flexural vibration peak of R-1,4-bond in β-CD preserved. In addition, the CM-EACD@Si had a new characteristic absorption peak at 1718 cm$^{-1}$, which was mainly due to the presence of the stretching vibration absorption peak of C=O in the carboxylate ion. This could also prove that COO$^-$ group was introduced to the surface of the EA-β-CD@Si, that is, the carboxymethylation-modified material was successfully obtained and further modification was realized.

The adsorption rates of the modified cyclodextrin/mesoporous silica adsorbent material prepared in Example 1 for adsorption in a 20 mg/L Pb$^{2+}$ and Cd$^{2+}$ solution were 80.6% and 67.7%.

Example 2: Preparation of CM-EACD@Si

A preparation method of a modified cyclodextrin/mesoporous silica adsorbent material for selectively adsorbing Pb$^{2+}$ and Cd$^{2+}$ included the following steps:

Cyclodextrin/mesoporous silica powder (5 g) and NaOH particles (4.65 g) were dissolved in distilled water (18.5 mL), 13.5 mL of a 16.3% chloroacetic acid solution was added, the reaction mixture was reacted at 50° C. for 6 h, cooling was performed, 36% HCl was added to adjust a pH of the solution to 7, the product was precipitated with 50 mL of methanol, the mixture was filtered, the product was washed, and vacuum drying was performed at 40° C. to obtain 4.55 g of CM-EACD@Si.

The adsorption rates of the modified cyclodextrin/mesoporous silica adsorbent material prepared in Example 2 for adsorption in a 20 mg/L Pb$^{2+}$ and Cd$^{2+}$ solution were 95.6% and 80.7%.

Example 3: Preparation of CM-EACD@Si

A preparation method of a modified cyclodextrin/mesoporous silica adsorbent material for selectively adsorbing Pb$^{2+}$ and Cd$^{2+}$ included the following steps:

Cyclodextrin/mesoporous silica powder (5 g) and NaOH particles (2.5 g) were dissolved in distilled water (10 mL), 10 mL of a 16.3% chloroacetic acid solution was added, the reaction mixture was reacted at 80° C. for 6 h, cooling was performed, 36% HCl was added to adjust a pH of the solution to 7, the product was precipitated with 50 mL of methanol, the mixture was filtered, the product was washed, and vacuum drying was performed at 40° C. to obtain 3.68 g of CM-EACD@Si.

The adsorption rates of the modified cyclodextrin/mesoporous silica adsorbent material prepared in Example 3 of the disclosure for adsorption in a 20 mg/L Pb$^{2+}$ and Cd$^{2+}$ solution were 83.6% and 72.2%.

Example 4: Application of CM-EACD@Si as Adsorbent in Single Metal Ion System

Using the CM-EACD@Si prepared in Example 2 as an adsorbent, Pb$^{2+}$, Cd$^{2+}$ and Cu$^{2+}$ were selected as typical HMs to research removal effects of EA-β-CD@Si and CM-EACD@Si on HMs. Corresponding HMs concentrations at 283.3 nm, 228.8 nm and 324.8 nm were respectively measured by an atomic absorption spectrophotometer.

1. Influence of pH on Removal Effect:

Different pH of the solution will influence distribution of surface charges of the material, resulting in different electrostatic attraction between the material and the HMs. A 20 mg/L HMs (Pb$^{2+}$, Cd$^{2+}$, Cu$^{2+}$ and Ca$^{2+}$) solution was prepared. 50 mL of the solution was taken, and 20 mg of CM-EACD@Si was weighed and placed in the solution. The pH of the solution was adjusted to 2-6 with NaOH/HCl. The mixture was shaken at a constant temperature of 30° C. for 2 h, and the HMs concentrations of the supernatant were measured. The results are shown in FIG. 3.

Figure 3:
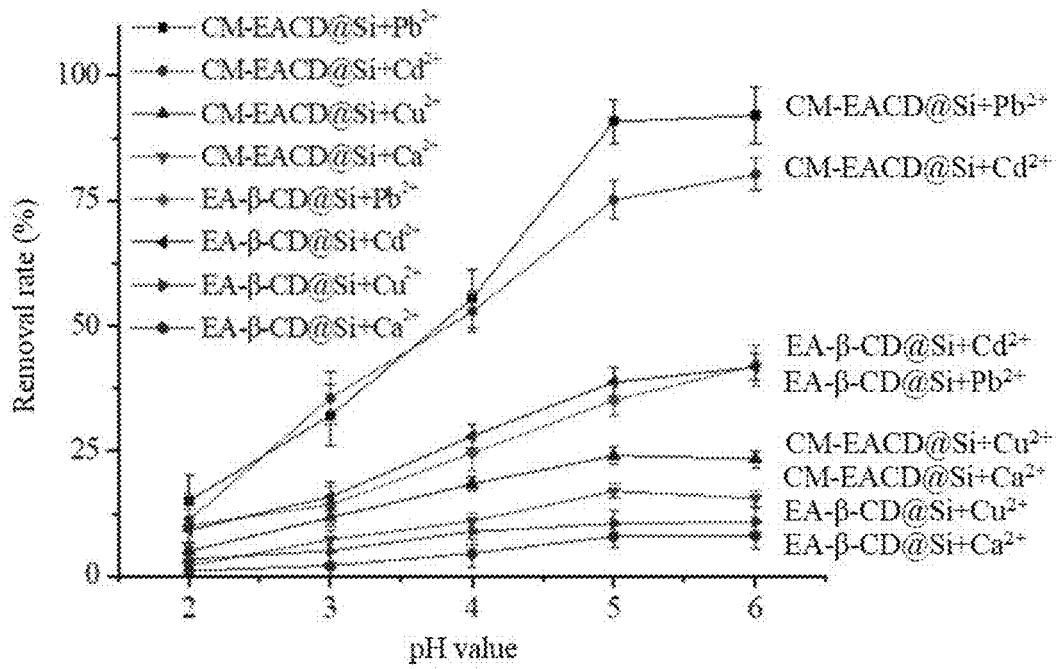
FIG. 3 shows influence of pH value on HMs adsorption on CM-EACD@Si.

It can be seen from FIG. 3 that the overall HMs adsorption capacity increases as the pH value increases, and the adsorption effect of the CM-EACD@Si is higher than that of the EA-β-CD@Si. This is because the carboxyl deprotonation degree on the material surface increases, the surface charge density increases, and HMs are removed through electrostatic or ionic interaction between the HMs (positively charged) and COO$^-$ (negatively charged); and when the pH<6, the HMs mainly exist as M$^{2+}$ and M(OH)$^+$, and the variation of the adsorption capacity is mainly related to the isoelectric point. At a pH higher than the isoelectric point, the carboxylate ions (negatively charged) have a strong coordination affinity to the metal ions (positively charged), and the attraction also makes the carboxylate ions trap M$^{2+}$ through surface complexation, thereby forming a chelate whose complexation degree increases with the increase of pH. At a pH lower than the zero point charge, there is repulsive force between positive charges on the surface of the CM-EACD@Si and the HMs, so that the overall removal effect is weak. The maximum adsorption effect is at pH=6. The overall adsorption effect of the CM-EACD@Si on HMs is: Pb$^{2+}$ (92.02%)>Cd$^{2+}$ (80.29%)>>Cu$^{2+}$ (23.4%)>Ca$^{2+}$ (15.42%), that is, in the whole process, the removal effect on the first two ions is obviously better than the removal effect on the last two, and the removal effect on the Ca$^{2+}$ is the weakest.

2. Influence of Adsorption Time on Removal Effect:

A 50 mg/L HMs (Pb$^{2+}$, Cd$^{2+}$ and Cu$^{2+}$) solution was prepared, 20 mL of the solution was taken respectively, 20 mg of CM-EACD@Si was weighed and placed in the solution, the mixture was shaken at a constant temperature of 30° C. for adsorption for 1 h, sampling was performed at regular intervals, the sample was shaken at a constant temperature of 30° C. for 2 h, and the HMs concentration of the supernatant was measured. The results are shown in FIG. 4.

Figure 4:
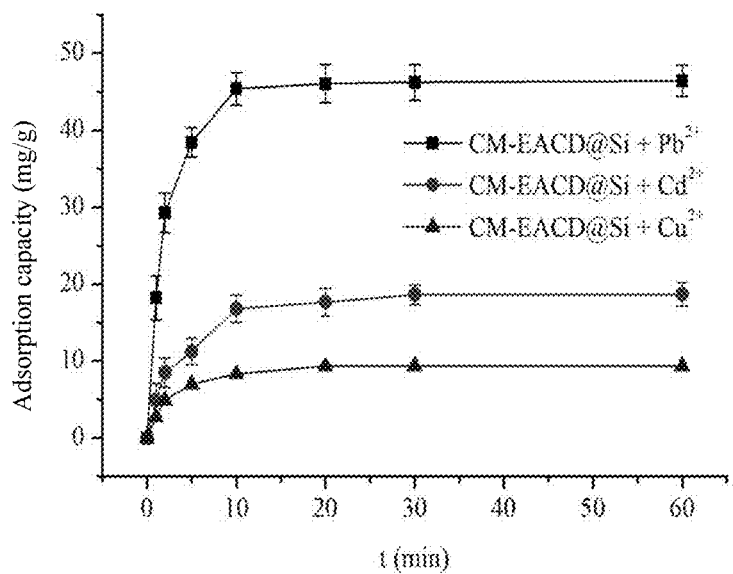
FIG. 4 shows influence of adsorption time on HMs adsorption on CM-EACD@Si.

FIG. 4 shows a relation diagram of Pb$^{2+}$/Cd$^{2+}$/Cu$^{2+}$ adsorption capacity (Qt, mg/g) of CM-EACD@Si as a function of contact time in a 50 mg/L HMs solution with a pH of 5.5-6 and a temperature of 30° C. It can be seen from the figure that the Pb$^{2+}$/Cd$^{2+}$/Cu$^{2+}$ adsorption capacity of the CM-EACD@Si increases with the increases of the contact time, and the overall adsorption rate is high. The CM-EACD@Si is in a quick adsorption state within 0-5 min, and has achieved an equilibrium state within 10-15 min. Compared with currently reported materials, for example, an activated carbon/chitosan composite material, a β-CD/graphene oxide composite material and a β-CD/SiO2 composite material, the use of the CM-EACD@Si to adsorb HMs requires shorter time to achieve the equilibrium, which is mainly because abundant COO$^-$ distributed on the surface may quickly electrostatically interact with the HMs (positively charged) and unreacted hydroxyl groups in the β-CD molecule may quickly chelate with the HMs, thereby realizing quick adsorption.

3. Adsorption Kinetic Experiment

A 1000 mg/L HMs ($Pb^{2+}$, $Cd^{2+}$ and $Cu^{2+}$) stock solution was prepared. At 25° C., an adsorption kinetic experiment was respectively performed in 50 mL of a 50 mg/L HMs solution containing 50 mg of EA-β-CD@Si and CM-EACD@Si. The pH was controlled with HNO$_3$/NaOH. After the adsorption was completed, the supernatant was taken, and filtered through a filter membrane with a pore size of 0.22 μm for separation, so as to measure the residual HMs concentration. The results are shown in FIG. 5 and Table 1.

TABLE 1

Quasi-second-order kinetic parameters of different HMs

| | Fitting equation | $R^2$ | $K_2$/min$^{-1}$ | Qe, cal/(mg/g) | $R^2$ | Qe, exp/(mg/g) |
|---|---|---|---|---|---|---|
| $Pb^{2+}$ | 0.02106x + 0.00576 | 0.9994 | 0.0206 | 47.9846 | 0.9966 | 46.4124 |
| $Cd^{2+}$ | 0.05085x + 0.02767 | 0.9975 | 0.0509 | 19.6657 | 0.9896 | 30.4405 |
| $Cu^{2+}$ | 0.10295x + 0.0879 | 0.9986 | 0.0752 | 11.3645 | 0.9931 | 10.3672 |

Figure 5A:
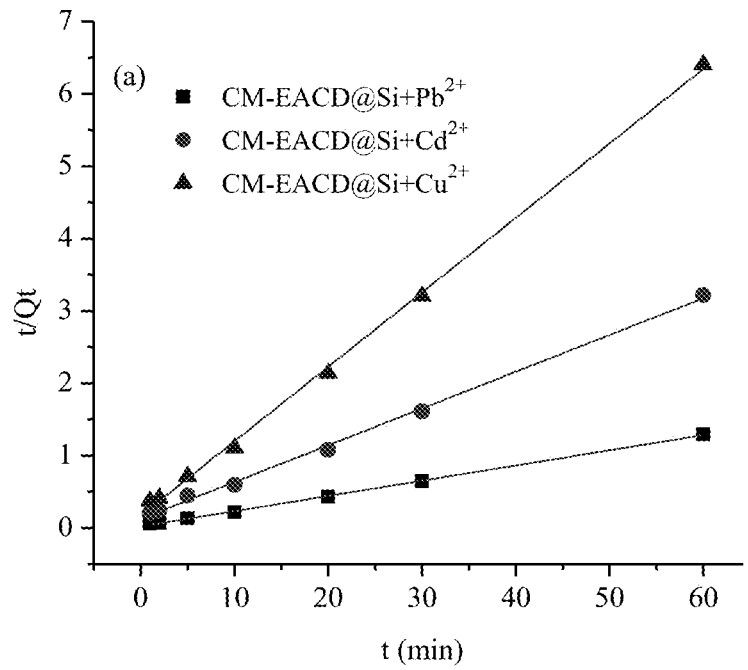
FIG. 5A shows quasi-second-order kinetic fitting.

FIG. 5A and Table 1 show the quasi-second-order kinetic fitting graph of CM-EACD@Si for the three HMs and the corresponding kinetic parameter results. It can be seen from the figure and the table that the fitting linear correlation coefficients $R^2$ of the three HMs are all greater than 0.997, which are very consistent with the quasi-second-order kinetic fitting with chemical adsorption as the dominant influencing factor, and the maximum adsorption capacities for the corresponding three HMs are respectively $Pb^{2+}$ (46.4124 mg/g), $Cd^{2+}$ (30.4405 mg/g) and $Cu^{2+}$ (10.3672 mg/g), which are very close to the calculated results by fitting.

Figure 5B:
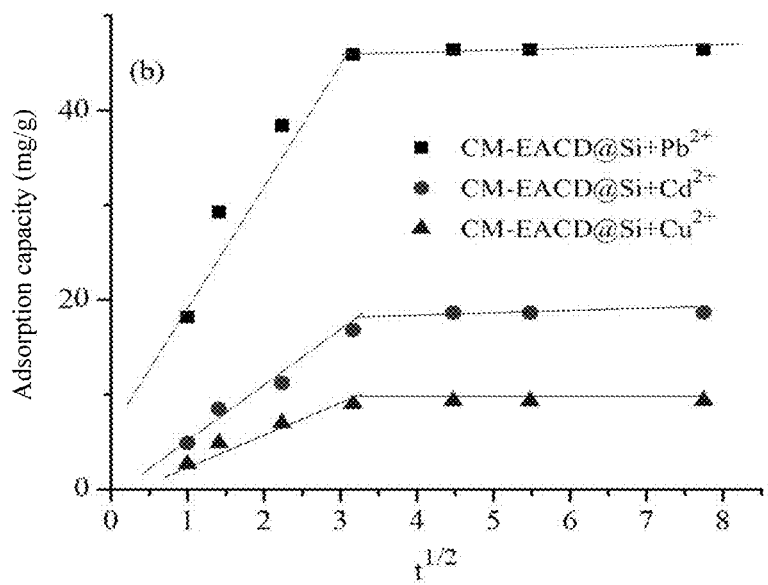
FIG. 5B shows particle internal diffusion fitting.

FIG. 5B shows fitting of the particle internal diffusion model. The fitting means that in a uniformly mixed solution, the particle internal diffusion rate is the main rate control step, and if there is an external resistance or chemical action, the fitting result is linear without passing through the origin. It can be seen from the figure that for the three HMs with an initial concentration of 50 mg/L, qt of the CM-EACD@Si is not linearly related to t %, but is synthesized by two straight lines and does not pass through the origin either. This indicates that the whole process involves 2 steps, and each step has a different control mechanism: the first stage may be attributed to HMs diffusing to the outer surface of the material through solution and to the inner surface of the material through the boundary layer, and the second stage is attributed to HMs then diffusing in the particles. Generally, since the HMs diffuse into the internal structure of the material, as the diffusion velocity of diffusion pores becomes smaller, the diffusion rate will decrease slowly. Based on this, it can be inferred that the adsorption process of CM-EACD@Si on HMs is mainly surface adsorption, and the surface adsorption rate is obviously higher than the internal diffusion rate.

Example 5: Application of CM-EACD@Si as Adsorbent in Composite Metal Ion System

In order to test the interactive competitive effect of certain HMs in a multi-metal solution, removal efficiencies of the CM-EACD@Si on the HMs in a single-element system, a two-element system and a three-element system were compared.

Using the CM-EACD@Si prepared in Example 2 as an adsorbent, in order to research the influence of other interfering ions on the CM-EACD@Si while adsorbing the HMs, the adsorption effects of several HMs in different mixed systems were compared. Each of the HMs was made into a mixed solution with the same mass concentration (20 mg/L), the mixed solution was shaken for 2 h, and the HMs concentration of the supernatant was measured. The results are shown in FIG. 6.

Figure 6:
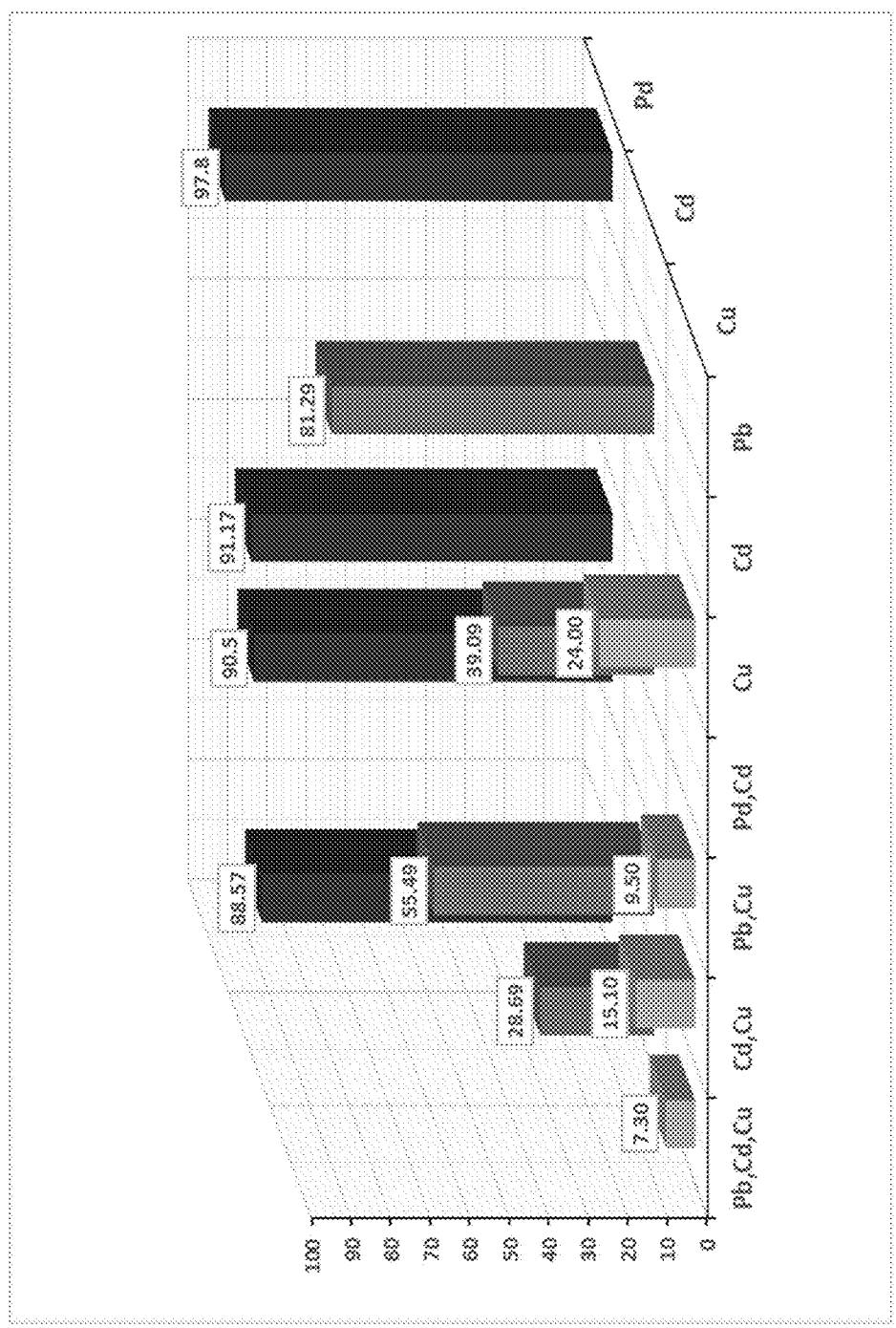
FIG. 6 shows removal effects under a multielement composite system.

FIG. 6 shows removal effects of the CM-EACD@Si on the HMs in different systems. It can be seen that the removal rates for the single-element systems are respectively 97.80% for $Pb^2+$, 81.29% for $Cd^{2+}$ and 24.00% for $Cu^{2+}$. In a two-element system containing $Pb^{2+}$, the presence of $Cd^{2+}$ or $Cu^{2+}$ slightly reduces $Pb^{2+}$ adsorption (91.17% and 90.05% respectively). However, in the same two-element system, the removal rate of $Cd^{2+}$ or $Cu^{2+}$ is significantly reduced to 39.09% and 9.50% respectively, which indicates that $Pb^{2+}$ will be preferentially adsorbed on the surface of the CM-EACD@Si while $Cd^{2+}$ or $Cu^{2+}$ has weaker affinity. In the two-element system ($Cd^{2+}$, $Cu^{2+}$), the removal rates of $Cd^{2+}$ and $Cu^{2+}$ are reduced to 55.49% and 15.1% respectively, indicating the mutual competitiveness of the two ions. In a three-element mixed system, the removal rate of $Pb^{2+}$ by the CM-EACD@Si is slightly reduced (88.57%), and the removal rates of $Cd^{2+}$ and $Cu^{2+}$ are lower than those in the single-element or two-element system (being only 28.69% and 7.30%), that is, the adsorption capacity of the CM-EACD@Si in the multielement system mixed solution will be lower than that in the single-element system, which can be attributed to the reduced availability of binding sites. In the multielement system solution, metals with greater affinity can replace other metals with weaker affinity. After various comparisons, it is found that the removal rates of three HMs are in the order of $Pb^{2+}>Cd^{2+}>Cu^{2+}$, and even in the three-element composite system, the CM-EACD@Si still has a removal effect of more than 80% on $Pb^{2+}$.

Example 6: Application of CM-EACD@Si as Adsorbent in Actual Sewage

Considering that not only some HMs in actual sewage, but also pollutants such as electrolytes and organic matters will influence the adsorption behavior, certain competitive adsorption behaviors will occur in aqueous solutions. Therefore, it is necessary to study the competitive effect of coexisting anions and cations. A series of different concentrations (20 mg/L and 50 mg/L) of $Ni^{2+}$, $Mg^{2+}$, $Ca^{2+}$, $Na^+$, $K^+$, $SO_4^{2-}$ and $NO_3^-$ were selected and added to 50 mL of different concentrations (20 mg/L and 50 mg/L) of $Pb^{2+}$ solutions, the mixture was shaken for 2 h, and the HMs concentration of the supernatant was measured.

Figure 7:
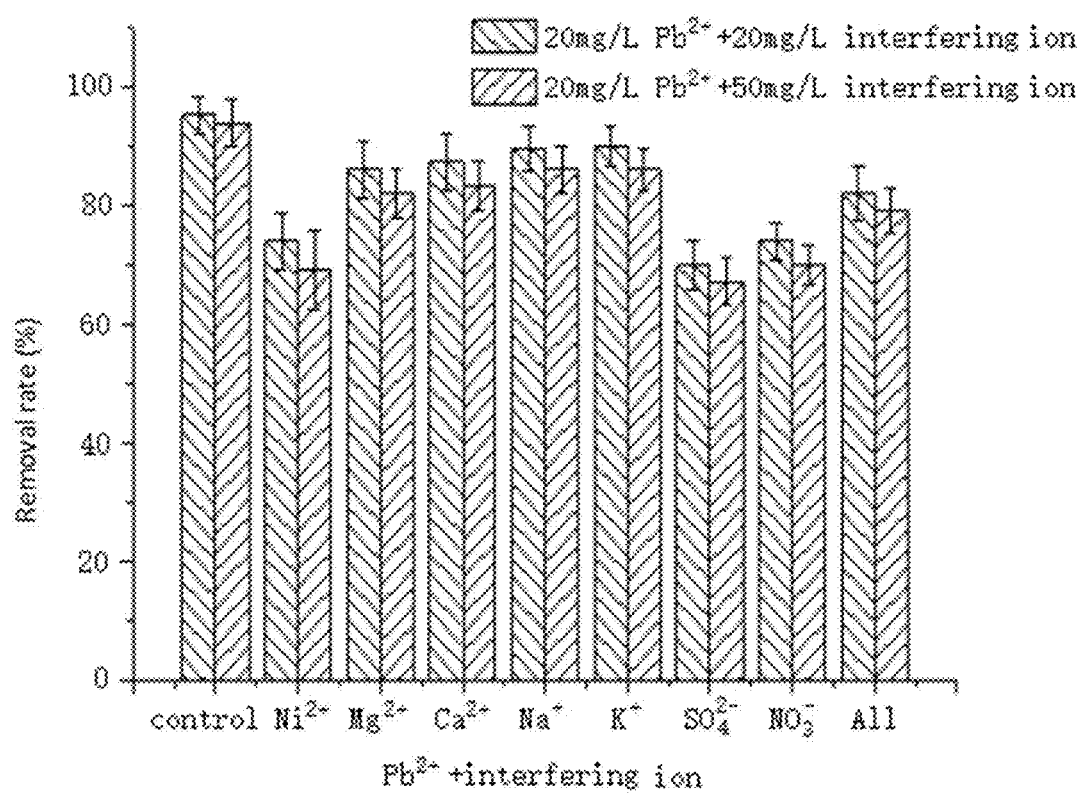
FIG. 7 shows influence of interfering ions on removal effects.

After adding mixed system solutions containing one or more ions respectively to the solution containing $Pb^{2+}$, the influence of multiple interfering ions on the $Pb^{2+}$ removal effect was inspected, as shown in FIG. 7. It can be seen from FIG. 7 that when the $Pb^{2+}$ is mixed with multiple other ions, the adsorption effect of the CM-EACD@Si on $Pb^{2+}$ is inhibited to varying degrees, and especially $Ni^{2+}$, $SO_4^{2-}$ and $NO_3$ have significant influence on the adsorption effect. In addition, the removal effect of the CM-EACD@Si on $Pb^{2+}$ is slightly inhibited with the increase of concentrations of $K^+$, $Na^+$, $SO_4^{2-}$ and $NO_3^-$, and is significantly inhibited with the increase of concentrations of $Ni^{2+}$, $Mg^{2+}$ and $Ca^{2+}$, which is mainly due to the difference in the ionic radius of the cations and the different affinities for different ions. The main influence of anions is that under acidic conditions, functional groups on the surface of the CM-EACD@Si are easily protonated, which will bind with $SO_4^{2-}$ and $NO_3^-$ existing in the solution, and the active sites on the surface of the CM-EACD@Si are definite, which will make the removal of $SO_4^{2-}$ and $NO_3^-$ by CM-EACD@Si compete with the removal of $Pb^{2+}$, so that part of the active sites are occupied by other anions, thereby inhibiting the adsorption on $Pb^{2+}$.

Example 7: Reproducibility and Reusability

Saturated CM-EACD@Si was added to three desorption solutions (0.1 mol/L nitric acid, sodium ethylene diamine tetraacetate and phosphoric acid) for desorption study. After the mixture was shaken at 230 rpm for 2 h, the HMs concentration in the supernatant was measured, and the adsorption-desorption process was carried out three cycles to verify the reusability.

Figure 8A:
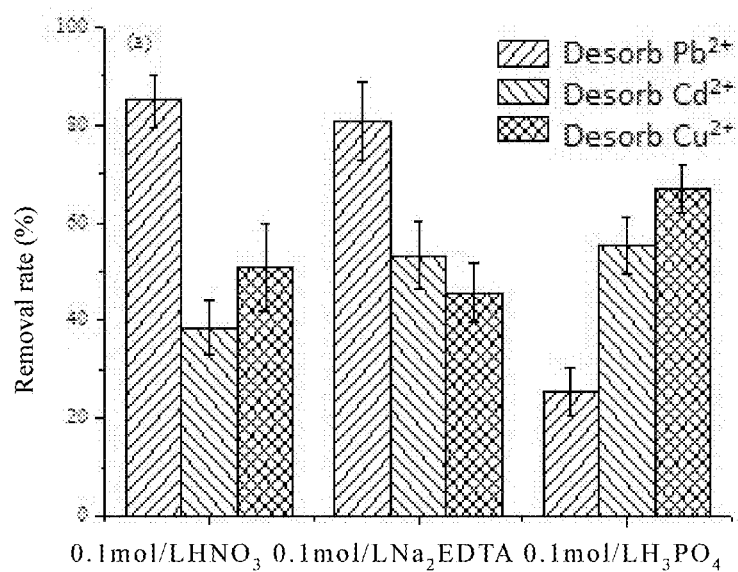
FIG. 8A shows desorption results under three different types of desorption solutions.
Figure 8B:
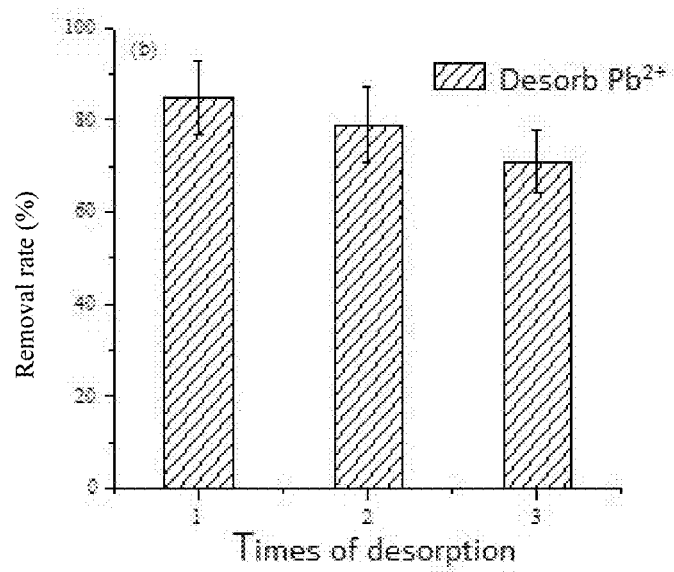
FIG. 8B shows effects of three times of desorption on $Pb^{21}$ in a 0.1 mol/L $HNO_3$ solution.

From an economic point of view, reproducibility and stability are the two major concerns of adsorbent materials. In view of the reusability for HMs, three types of desorption solutions (a 0.1 mol/L $HNO_3$ solution, a $H_3PO_4$ solution and a $Na_2EDTA$ solution) were selected for inspection in this study. The desorption results of the three different types of desorption solutions are shown in FIG. 8A. It can be found that the $HNO_3$ and $Na_2EDTA$ solutions have better desorption effects on $Pb^{2+}$ (84.51% and 80.75%), and the $H_3PO_4$ has better desorption effects on $Cd^{2+}$ and $Cu^{2+}$ (55.48% and 66.89%), indicating that: the binding of the active sites of the CM-EACD@Si with the HMs cannot be maintained for a long time under acidic conditions, and $H^+$ protonates the surface of the material, which is more beneficial to the reproduction of carboxyl ($COO^-$), so that the positively charged HMs adsorbed on the surface of the material are more easily desorbed. In addition, the desorption effects of the $Na_2EDTA$ on the three HMs are in an order of $Pb^{2+}$ >$Cd^{2+}$>$Cu^{2+}$, which is because the stronger ligand in the $Na_2EDTA$ will form a stronger bond with $Pb^{2+}$, making $Pb^{2+}$ more easily desorbed from the CM-EACD@Si. In addition, the effects of three times of desorption on $Pb^{2+}$ in the 0.1 mol/L $HNO_3$ solution were also researched, as shown in FIG. 8B. It can be seen that the removal rate of $Pb^{2+}$ by CM-EACD@Si can still reach about 71% after three times of desorption, which is mainly because the result reveals the stability and recoverability of CM-EACD@Si in practical application when pH is reached.

Although the disclosure has been disclosed as above in the preferred examples, it is not intended to limit the disclosure. Anyone familiar with this technology can make various changes and modifications without departing from the spirit and scope of the disclosure. Therefore, the protection scope of the disclosure should be as defined in the claims.

What is claimed is:

1. A method for quickly and selectively adsorbing Pb, which comprises:
   performing a carboxymethyl modification of CD-EA-Si@Si by contacting the CD-EA-Si@Si with chloroacetic acid to prepare cyclodextrin/mesoporous silica, and
   absorbing Pb in sewage by contacting the sewage with the cyclodextrin/mesoporous silica;
   wherein absorbing occurs at a pH of 4 to 6,
   wherein an adsorption time is 5 minutes to 2 hours, and
   wherein carboxymethyl modification to prepare cyclodextrin/mesoporous silica comprises:
   (a) dissolving the CD-EA-Si@Si and NaOH in distilled water, adding a chloroacetic acid solution, stirring, reacting at 40° C. to 80° C. for 6 hours to 18 hours, and cooling; and
   (b) adjusting a pH after the reaction in step (a), precipitating a product with a methanol solution, filtering the product, washing the product, and drying the product at 40° C. to 60° C.

2. A method for quickly and selectively adsorbing Pb and Cd, which comprises,
   performing a carboxymethyl modification of CD-EA-Si@Si by contacting the CD-EA-Si@Si with chloroacetic acid to prepare cyclodextrin/mesoporous silica, and
   absorbing $Pb^{2+}$ and $Cd^{2+}$ in sewage by contacting sewage with the cyclodextrin/mesoporous silica;
   wherein absorbing is conducted at a pH of 4 to 6,
   wherein an adsorption time is 5 minutes to 2 hours, and
   wherein carboxymethyl modification to prepare cyclodextrin/mesoporous silica comprises:
   (a) dissolving the CD-EA-Si@Si and NaOH in distilled water, adding a chloroacetic acid solution, stirring, reacting at 40° C. to 80° C. for 6 hours to 18 hours, and cooling; and
   (b) adjusting a pH after the reaction in step (a), precipitating a product with a methanol solution, filtering the product, washing the product, and drying the product at 40° C. to 60° C.

3. The method according to claim 2, wherein a mass ratio of the CD-EA-Si@Si to the NaOH in step (a) is 0.5:1 to 2.5:1.

4. The method according to claim 2, wherein an amount of the distilled water in step (a) is 1 to 5 times a total mass of the CD-EA-Si@Si and the NaOH.

5. The method according to claim 2, wherein a concentration of the chloroacetic acid in step (a) is 5% to 25%, and wherein an amount is 0.5 to 2.5 times a total mass of the CD-EA-Si@Si and the NaOH.

6. The method according to claim 2, wherein in step (b), the pH of is adjusted to 5 to 9.

7. The method according to claim 2, wherein performing a carboxymethyl modification of CD-EA-Si@Si comprises:

(i) dissolving the CD-EA-Si@Si and the NaOH in distilled water, adding the chloroacetic acid, stirring, incubating at 40° C. to 80° C. for 6 hours to 18 hours, and cooling;

wherein a mass ratio of the CD-EA-Si@Si to the NaOH is 0.5:1 to 2.5:1;

wherein a concentration of the chloroacetic acid is 5% to 25%, and wherein an amount is 0.5 to 2.5 times a total mass of the CD-EA-Si@Si and the NaOH; and (ii) adjusting a pH after the reaction in step (i), precipitating a product with a methanol solution, filtering the product, washing the product, and drying the product at 40° C. to 60°;

wherein the pH is adjusted to 5 to 9.

8. The method according to claim 2, wherein the performing a carboxymethyl modification of CD-EA-Si@Si comprises:

adding 5.0 g of the CD-EA-Si@Si and 4.65 g of the NaOH into 18.5 mL of ultrapure water, stirring at room temperature, adding 13.5 mL of a 16.3% chloroacetic acid solution, incubating at 60° C. for 6 hours, cooling, adding 36% HCl to adjust a pH to 7, precipitating a product with methanol, filtering the product, washing the product, and vacuum drying the product to obtain the cyclodextrin/mesoporous silica.

9. The method according to claim 2, wherein the performing a carboxymethyl modification of CD-EA-Si@Si comprises:

dissolving 10 g of the CD-EA-Si@Si and 5 g of the NaOH in 10 mL of distilled water, adding 10 mL of a 10% chloroacetic acid solution, incubating at 60° C. for 10 hours, cooling, adding 36% HCl to adjust a pH to 6, precipitating a product with 50 mL of methanol, filtering the product, washing the product, and vacuum drying at 40° C. to obtain the cyclodextrin/mesoporous silica.

10. The method according to claim 2, wherein the performing a carboxymethyl modification of CD-EA-Si@Si comprises:

dissolving 5 g of EA-β-CD@Si and 2.5 g of the NaOH particles in 10 mL of distilled water, adding 10 mL of a 16.3% chloroacetic acid solution, incubating at 80° C. for 6 hours, cooling, adding 36% HCl to adjust a pH to 7, precipitating a product with 50 mL of methanol, filtering the product, washing the product, and vacuum drying at 40° C. to obtain the cyclodextrin/mesoporous silica.

\* \* \* \* \*